United States Patent Office 3,224,902
Patented Dec. 21, 1965

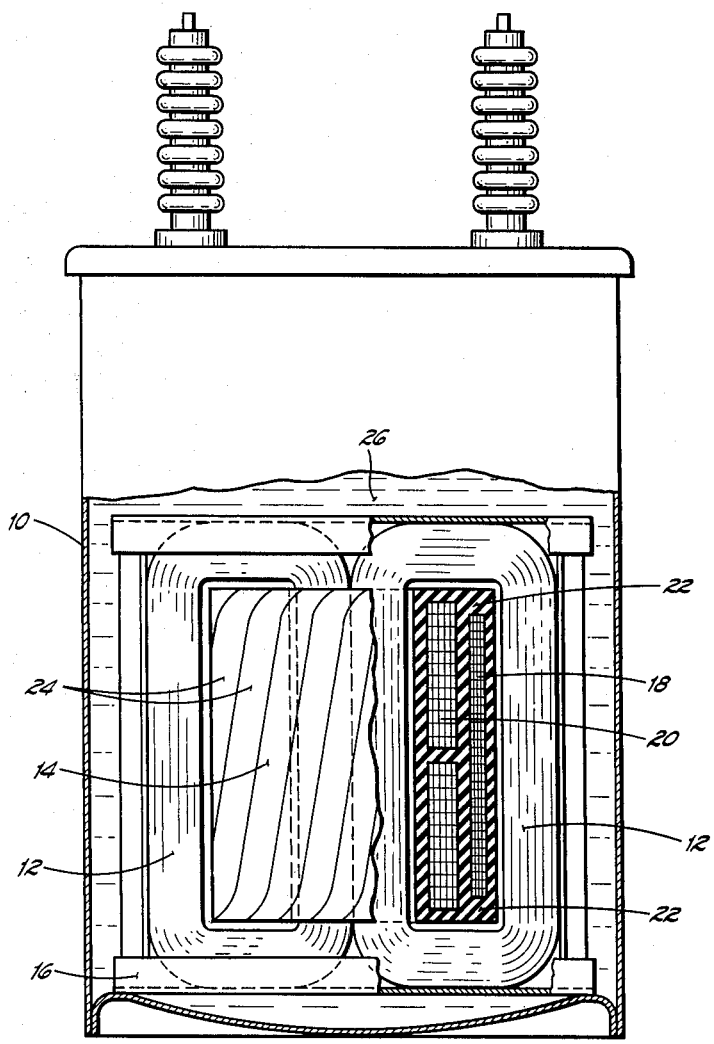

3,224,902
THERMALLY STABILIZED CELLULOSE
MATERIALS
Fred S. Sadler, Orange, N.J., and James D. Wadeson,
Lebanon, Pa., assignors to McGraw-Edison Company,
Milwaukee, Wis., a corporation of Delaware
Filed Sept. 7, 1961, Ser. No. 136,606
8 Claims. (Cl. 117—143)

This invention relates to protecting cellulose fibres against thermal deterioration.

Cellulose fibres tend to deteriorate when subjected to elevated temperatures for extended periods of time. This fact presents a very serious problem with respect to many applications of cellulose materials. For example, the problem is encountered in using cellulose fibre cord type reinforcing in rubber articles, such as pneumatic tires, steam hoses, conveyor belts and the like. It is also encountered in using cellulose insulation materials in electrical apparatus.

Cellulose fibre reinforced rubber articles are subjected to elevated temperatures in normal use, either from external heat, or from heat which is generated internally by reason of repeated rapid flexing, as in the case of pneumatic tires. The resultant deterioration of the reinforcing fibres is evidenced by a progressive reduction in their strength until eventually they break. This constitutes a principal cause of failure of such articles as pneumatic tires and steam hose.

The cellulose insulation materials which are used so extensively in electrical apparatus are also subjected to elevated temperatures in use. Here, however, the deterioration problem is increased by other factors, particularly when the insulation materials are in contact with or immersed in liquid dielectrics such as transformer oils. This is so because elevated temperatures also cause liquid dielectrics to break down into their chemical constituents, and the resultant products in turn attack the cellulose insulation materials. For this reason, cellulose insulation materials in contact with liquid dielectrics generally deteriorate at a far greater rate than they would if they were not in contact with such liquids.

Accordingly, one object of this invention is to provide a method of increasing the thermal stability of cellulose fibres and cellulose fibre materials.

Another object of the invention is to increase the resistance of cellulose materials to breakdown products of transformer oil and other liquid dielectrics.

Still another object of the invention is to provide articles of manufacture embodying cellulose fibres protected against thermal deterioration.

A further object of the invention is to provide treated cellulose insulation for electrical apparatus which when aged in oil at elevated temperatures has appreciably greater mechanical strength and thermal stability than conventional cellulose insulation materials.

A still further object of the invention is to provide cellulose insulation for electrical apparatus which will enable units of a given size to be operated at increased loads and higher operating temperatures in comparison with units of the same size which are insulated with conventional cellulose insulation materials, without a consequential loss in the life of the unit.

These and other objects and advantages of my invention will become apparent from the following detailed description when taken in conjunction with the accompanying drawing which illustrates the use of my treated cellulose insulation material in an oil filled transformer.

According to the principal aspect of this invention, cellulose fibre is protected against thermal degradation by treating it with a water solution containing dimethyl formamide and a protein and then drying off the water. I have found that this treatment greatly improves the ability of cellulose fibres to withstand the deteriorating action of heat over extended periods of time.

As another aspect of this invention, the above type thermal stabilization of cellulose materials is improved by incorporating one of the following phenolic compounds in the treating solution: acetyl p-aminophenol, m-cresol, phenol and p-aminophenol. It has been found that a dimethyl formamide-protein water solution which includes one of these phenolic compounds imparts a greater degree of thermal stabilization to cellulose fibres than one that does not. The best results have been obtained by using m-cresol in the solution.

According to still another aspect of this invention, I have found that the above described method of treating cellulose fibres not only protects the fibres against thermal deterioration but also stabilizes them against attack from breakdown products of transformer oil and other liquid dielectrics. For this reason, cellulose insulation materials treated in accordance with this invention are particularly well adapted for use in oil filled transformers and other similar electrical apparatus.

A transformer embodying cellulose insulation which has been treated in accordance with this invention is shown in the attached drawing. The transformer is encased within a tank 10 and consists essentially of a magnetic core 12 and a coil 14, both of which are supported in spaced relation from the bottom of tank 10 by channel support members 16 or the like. The coil 14 comprises a high voltage winding 18 and a low voltage winding 20 which are insulated from one another by the treated cellulose insulation 22. A treated cellulose wrapping 24 may also be applied to the exterior of the coil 14. A liquid dielectric 26 comprising oil, chlorinated diphenyl or the like is disposed within the tank 10 to cover the core 12 and the coil 14 in order to insulate them and to dissipate the heat generated during operation.

The solutions used in the practice of this invention are prepared by mixing the active ingredients (dimethyl formamide and a protein, with or without the above mentioned phenolic compounds) directly into the water. A preferred procedure is to hold the mixture at 85 to 90° C. with adequate mixing for at least 20 minutes.

Typically, the protein used may be either casein or an isolated soy protein. In particular, the isolated soy protein sold by Archer-Daniels-Midland Company of Cincinnati, Ohio, under their Adpro 410 trademark and grade designation has been found to work very well and is especially recommended.

In actually practicing the invention, the water solution of dimethyl formamide and a protein (with or without the above mentioned phenolic compounds) may be applied to the cellulose fibres in any suitable manner. Obviously the simplest way is to immerse the fibre material directly into solution or dispersion of the additives until the material is substantially impregnated. However, the solution can also be applied by spraying, brushing or by a size press addition.

During the treating process, the solution may be at room temperature or higher, even up to its boiling point. The time of contact between the cellulose fibre material and solution should be sufficient to permit substantial penetration of the fibres. Normally times of 1 to 10 minutes are adequate for this purpose, although longer times may also be employed without adverse effect.

It should be emphasized that in order to realize the benefits of this invention, the above described active ingredients must be actually present in the cellulose fibres when they are subjected to the heating which would ordinarily cause thermal deterioration. And generally, the greater the amount of active ingredients present, the more the cellulose fibres are stabilized. However, because several different active ingredients are used in varying proportions in the treating solution, it is difficult to provide a meaningful, quantitative indication of the degree of stabilization attained. I have found, however, that when these active ingredients are present in the fibres in an amount corresponding to 0.2–2.0% nitrogen by weight of the fibres, substantial improvement in the thermal stability of the fibres is obtained.

The concentration of active ingredients used in the treating solution may vary considerably, both with respect to the total ingredients and the individual additives. Although it is naturally somewhat more difficult to achieve the desired pick up of additives from a very dilute solution as compared to a more concentrated one, solutions containing as little as 1% active ingredients have been used. Typically, however, the solutions employed contain about 7.5% by weight of active ingredients.

Actually there is some question as to just how and why the above described treating solutions stabilize cellulose fibres. Although there is definitely some interaction between the active ingredients in the solutions, the exact nature of it is not at all clear. I have found, however, that when the treating solutions are evaporated to dryness, the resulting residue is a thin, brittle sheet which if left in the open air becomes flexible after a time. This would seem to indicate that the material takes on water from the air and may explain why it works so well in stabilizing cellulose fibres.

Although, as indicated above, the simplest way of applying the treating solution to the fibres is to immerse the fibres directly into the treating solution and although this method was used in treating the specific samples discussed hereinbelow, it is possible that, in the commercial application of this invention, some other method of treating the fibres will prove superior to the immersion method, at least for some purposes. Specifically, it is felt that the size press addition method may be of greater commercial significance.

The examples given below illustrate the practice of this invention and the improved results obtained in using the treated cellulose insulation material of this invention in electrical apparatus. It will be noted that the accelerated aging tests were conducted under conditions which were intended to duplicate insofar as possible the conditions to which cellulose insulation materials are subjected during the actual operation of an oil filled transformer.

In preparing each of the samples, a sheet of electrical grade kraft paper was immersed in an aqueous solution containing the designated amounts of the additives until the paper had become thoroughly soaked or impregnated. (The protein used was Adpro 410.) The impregnated paper sheet was allowed to air dry at room temperature, and then it was placed in a glass tube containing a 21" piece of 16 gauge, Formvar-coated copper wire and a 14" x 1" x 2" mil strip of copper foil. This paper-copper system was dried in an oven at 135° C. for 16 hours, during which time the tube was evacuated under an absolute pressure of 0.1 mm. At the end of the drying period, the evacuated tube containing the paper and copper was filled under vacuum with an inhibited transformer oil, leaving an air space in the tube of approximately 15% of the total volume. The air space was filled to one atmosphere pressure with dry air, and the tube was then sealed off with an oxygen gas torch. This sealed glass tube containing the treated paper, coated copper wire, copper foil and transformer oil, was placed in an oven at 170° C. for five days, after which time both the heat aged sample and the control were tested for tensile strength retained. The results of these tests are summarized in the table.

| Weight Percent of Additives in Aqueous Solution | Hrs. Aged at 170° C. | Percent of Original Strength Retained | Relative Strength |
| --- | --- | --- | --- |
| 0 | 0 | 100 | |
| 0 (control) | 120 | 68 | 100 |
| 5.0 dimethyl formamide<br>2.50 protein | 120 | 89.5 | 131.5 |
| 5.0 dimethyl formamide<br>1.25 protein<br>1.25 m-cresol | 120 | 103.5 | 158.0 |

The tabulated results clearly illustrate the improved thermal aging characteristics of cellulose fibre materials treated in accordance with this invention.

A principal advantage of using my treated cellulose insulation material in a transformer of the type illustrated is that it extends the useful life of the unit for a given transformer loading. Stated another way, this insulation permits a given size unit to be operated at higher loads and temperatures.

Although the invention has been described specifically in regard to treating cellulose insulation materials, it is to be understood that the invention also embraces stabilizing other forms of cellulose fibre materials.

While but a single embodiment of the invention has been illustrated and described, many modifications and variations thereof will be obvious to those skilled in the art, and consequently it is intended in the appended claims to cover all such modifications and variations which fall within the true spirit and scope of the invention.

We claim:

1. A cellulose material having improved thermal stability for use at elevated temperatures, comprising a base consisting of cellulose fibers impregnated solely with dimethyl formamide in an amount to provide a nitrogen content in the range of 0.2 to 2.0% in the dry base.

2. A method of increasing the thermal stability of cellulose fiber materials, which comprises the steps of mixing dimethyl formamide and a protein to provide a treating composition, and combining the composition with a base consisting essentially of cellulose fibers to provide a dry fiber base having a nitrogen content of 0.2 to 2.0% by weight of said fibers.

3. A method of increasing the thermal stability of cellulose fiber materials, which comprises the steps of admixing dimethyl formamide, a protein and a compound from the group consisting of acetyl p-aminophenol, m-cresol, phenol and p-aminophenol to provide a treating composition, and combining the composition with a base consisting essentially of cellulose fibers to provide a dry impregnated fiber base having a nitrogen content of 0.2 to 2.0% of said fibers.

4. A method of increasing the thermal stability of cellulose fiber materials, comprising the steps of impregnating a base consisting essentially of cellulose fibers with an aqueous solution of the combination of dimethyl formamide and a protein, and thereafter evaporating the water from said solution to provide a dry impregnated cellulose fiber material containing from 0.2 to 2.0% by weight of nitrogen.

5. A method of claim 3 in which the protein is an isolated soy protein and said compound is m-cresol.

6. A cellulose insulating material having improved thermal stability at elevated temperatures, comprising a dry base consisting essentially of cellulose fibers, said base being impregnated with a combination of dimethyl formamide and a protein, the dry impregnated fiber base containing from 0.2 to 2.0% by weight of nitrogen.

7. A cellulose insulating material having improved thermal stability at elevated temperatures, comprising a base consisting essentially of cellulose fibers, said base being impregnated with a combination of dimethyl formamide, a protein and a phenolic compound selected from the group consisting of acetyl p-aminophenol, m-cresol, phenol and p-aminophenol, said impregnated fiber base having a nitrogen content in the range of 0.2 to 2.0% by weight.

8. A cellulose insulating material having improved thermal stability at elevated temperatures, comprising a base consisting essentially of cellulose fibers, said base being impregnated with a combination of dimethyl formamide, isolated soy protein and m-cresol, said impregnated fiber base having a nitrogen content in the range of 0.2 to 2.0% by weight.

References Cited by the Examiner

UNITED STATES PATENTS

| | | | |
|---|---|---|---|
| 2,073,666 | 3/1937 | Wernlund | 117—156 |
| 2,534,326 | 12/1950 | Weaver | 117—34 |
| 2,591,466 | 4/1952 | Reynolds et al. | 117—156 |
| 3,135,627 | 6/1964 | Sadler | 117—156 |

FOREIGN PATENTS

| | | |
|---|---|---|
| 775,520 | 5/1957 | Great Britain. |

RICHARD D. NEVIUS, *Primary Examiner.*